United States Patent [19]
Heymann

[11] 3,857,542
[45] Dec. 31, 1974

[54] NOISE SUPPRESSING THROTTLE VALVE

[75] Inventor: Frank J. Heymann, Wilmington, Del.

[73] Assignee: Westinghouse Electric Corporation, Pittsburgh, Pa.

[22] Filed: Sept. 7, 1973

[21] Appl. No.: 395,311

Related U.S. Application Data

[63] Continuation of Ser. No. 260,226, June 6, 1972, abandoned.

[52] U.S. Cl............................ 251/120, 137/625.33
[51] Int. Cl............................................ F16k 47/02
[58] Field of Search....... 137/625.28, 625.3, 625.33, 137/625.37; 138/40; 251/118, 120, 121, 122, 210

[56] References Cited
UNITED STATES PATENTS

| 45,390 | 12/1864 | Cresson | 251/210 |
|---|---|---|---|
| 952,187 | 3/1910 | Donnelly | 251/120 |
| 982,981 | 1/1911 | Mueller | 251/120 |
| 1,020,959 | 3/1912 | Best | 251/325 X |
| 1,208,590 | 12/1916 | Lily | 251/325 |
| 2,114,858 | 4/1938 | Rosch | 251/122 |
| 2,649,273 | 8/1953 | Honegger | 251/118 X |
| 2,659,388 | 11/1953 | Rand | 251/120 |
| 3,468,341 | 9/1969 | Newcomb et al. | 137/625.3 |
| 3,602,261 | 8/1971 | Brown et al. | 137/625.3 |
| 3,776,278 | 12/1973 | Allen | 137/625.28 X |

FOREIGN PATENTS OR APPLICATIONS

| 45,599 | 5/1931 | Denmark | 137/625.3 |
|---|---|---|---|
| 1,075,011 | 10/1954 | France | 137/625.3 |

Primary Examiner—William R. Cline
Assistant Examiner—Gerald A. Michalsky
Attorney, Agent, or Firm—F. J. Baehr, Jr.

[57] ABSTRACT

A noise suppressing steam throttle valve having a concentric plug and seat, wherein the plug has a skirt extending downstream of the seating surface and the skirt has a plurality of differently shaped serrations, which break up the flow of steam to reduce the noise created by the valve as the plug separates from the seat and is moved away therefrom, and as the plug approaches its fully opened position the pressure drop across the plug and seat is minimized.

7 Claims, 2 Drawing Figures

NOISE SUPPRESSING THROTTLE VALVE

This is a continuation, of application Ser. No. 260,226 filed June 6, 1974 now abandoned.

BACKGROUND OF THE INVENTION

This invention relates to large steam valves and more particularly to such valves having noise suppressing means disposed therein.

With the advances in technology the pressure and temperature of the steam supplied to a steam turbine and the size of the turbine have increased, resulting in extremely high pressure drops across the control valves, which are necessarily operated over wide ranges of pressure drops, i.e. from about 2 percent of full line pressure, when fully opened, to 100 percent when fully closed. Pressure drops in excess of 50 percent of line pressure, characteristically create high intensity noises and vibrations, so that some type of noise and vibration suppressing device is normally disposed in the valve. However, such devices hereinbefore employed had higher pressure drops, when the valve was fully opened, than the valves hereinafter disclosed.

SUMMARY OF THE INVENTION

In general a stem throttle valve when made in accordance with this invention, comprises a fluid inlet port, a fluid outlet port, a valve plug and a seat. The seat is interposed between the ports and is adapted to cooperate with the plug to block the flow of fluid between the ports, when the plug is seated on the seat. The plug has a seating surface which registers with the seating surface on the seat, and a skirt, which extends downstream of the seating surface on the plug. The skirt has a plurality of serrations disposed in the downstream end thereof to reduce the noises produced as the valve begins to open.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
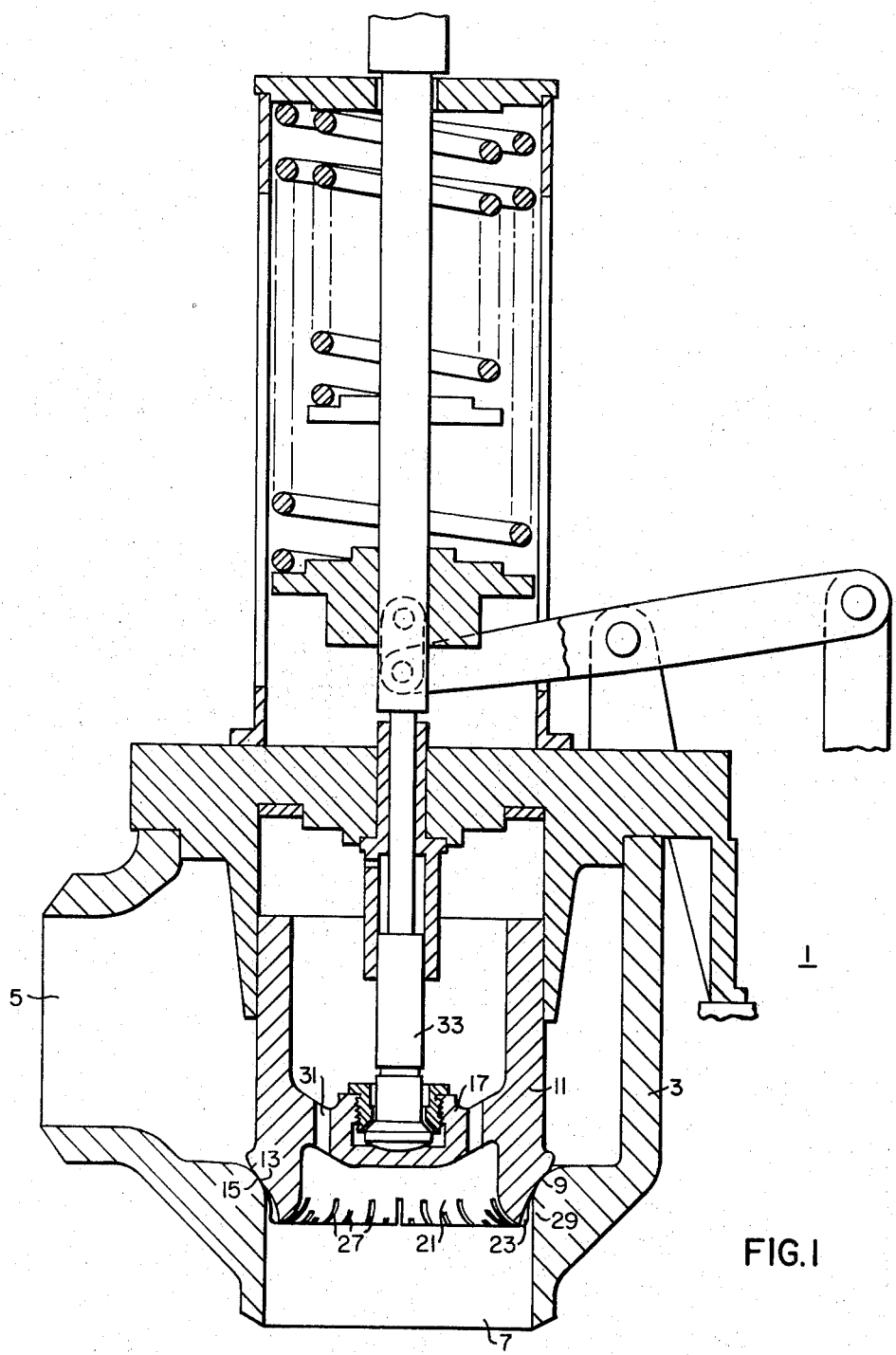
FIG. 1 is a sectional view of a portion of a valve incorporating this invention.
Figure 2:
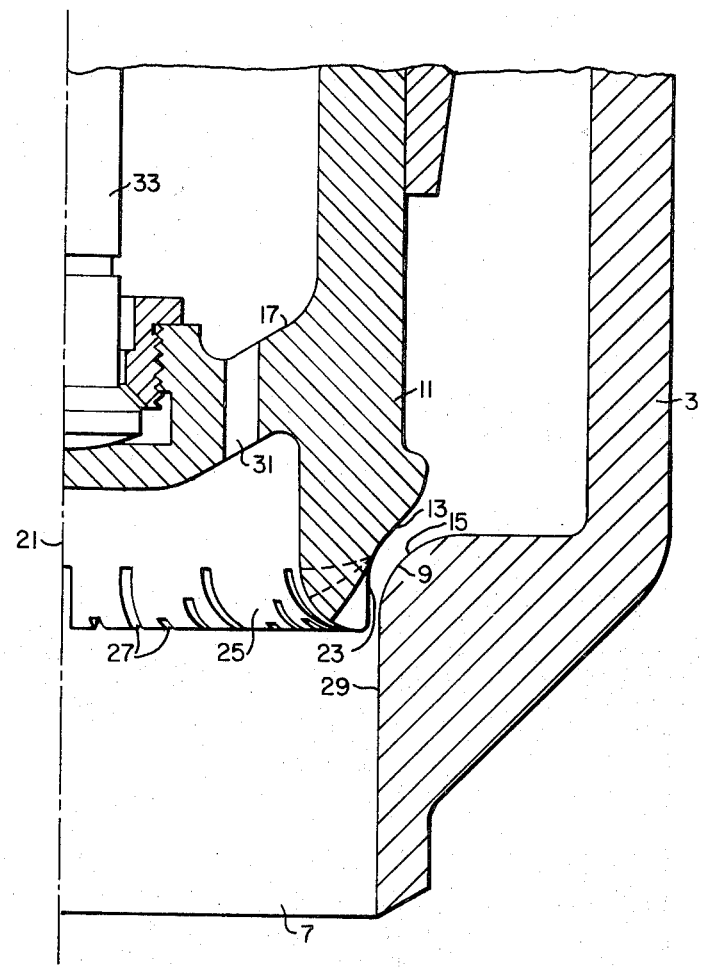
FIG. 2 is an enlarged fragmentary sectional view of a part of the valve shown in FIG. 1.

Referring now to the drawings in detail, FIG. 1 shows a steam throttling plug valve 1 having a body portion 3, a fluid or steam inlet port 5, a fluid or steam outlet port 7, a seat 9 interposed between the inlet and outlet ports 5 and 7 and a reciprocal plug 11. The plug 11 has an annular seating surface 13, which registers with a mating angular seating surface 15 on the seat 9. The plug 11 and seat 9 are, thus, cooperatively associated to block the flow of steam from the inlet to the outlet port, when the plug is seated.

As shown in the drawing, the plug 11 is generally cylindrically shaped and has a web 17, which traverses the downstream end or lower portion of the plug. The web 17 is generally shaped and has its convex surface facing downstream, and is recessed from the downstream end of the plug 11 in order to remove the web face from the immediate area of high flow and turbulence.

A relatively thin wall skirt 21 having an outer surface of circular cross section or a cylindrical surface 23 and an inner toroidal surface 25 extends downwardly from the seating surface 15 of the plug 11 to form a cavity in the plug 11. The skirt 21 has a plurality of differently shaped serrations, notches or grooves 27 extending from the upstream end of the cylindrical surface 23 and generally alligned with the fluid flow. The number of serrations is large, in excess of 20, and the different shaped serrations are arranged randomly, or at least arranged in a predetermined irregular order, so as to provide a multiplicity of differently shaped and differently oriented flow passages, which cooperate to develop differently shaped flow passage ways having different open areas, which produce shock at different locations for a given pressure drop across the plug and seat, to produce incoherent shock structures or waves, which inhibit shock cell oscillations responsible for the noise and vibrations produced by the high velocity flows resulting from large pressure drops.

The grooves 27 are disposed to originate adjacent the seating surface 13 on the plug 11 and they are formed in such a manner as to increase in depth irregularly or at a different rate as they progress towards the downstream end of the skirt 21 in order to spread out the region in which throttling takes place, to assist in dissipating the high velocity and lessening the intensity of the turbulence by involving a greater quantity of the ambient fluid in the resulting turbulence.

Downstream of the seating area 15 on the seat 11, there is also a surface of circular cross section or a cylindrical surface 29, which cooperates with the cylindrical surface 23 to direct the flow of steam through the serrations as the plug separates from its seat.

The valve, as shown in the drawings, is a piston type and has balance holes 31 disposed in the web 17 to balance the pressure on both sides of the web to reduce the forces, which must be applied through a stem 33 to open and close the valve. However, it is understood that the invention, hereinbefore described, may advantageously be used on any type of throttle valve, which is utilized to throttle the flow of any high pressure fluid and to reduce the noise and vibrations produced as the plug separates from the seat and yet minimize the pressure drop when the valve is fully open.

What is claimed is:

1. A valve for a fluid, said valve comprising a fluid inlet port and a fluid outlet port, a plug and a seat, said seat being interposed between said ports and adapted to cooperate with the plug to block the flow of fluid between said ports, when the plug is seated; said plug having a seating surface, which registers with the seating surface of said seat, a hollow cylindrical portion, a web portion which traverses the cylindrical portion and is disposed adjacent the plug's seating surface, and a relatively thin wall skirt portion disposed downstream of the plug's seating surface to form a cavity within the downstream end of the plug; said skirt having a plurality of different depth serrations, which generally originate an equal distance from the plug's seating surface and extend through said skirt into said cavity; said serrations being disposed in a predetermined irregular order to provide a plurality of passageways of different depth to the inside of said cavity, whereby as the plug separates from said seat, the fluid begins flowing through all the passageways to the inside of said cavity producing incoherent shock waves, which inhibit shock cell oscillations to attenuate the noise produced by the high velocity fluid.

2. A valve as set forth in claim 1 wherein the skirt has at least 20 serrations disposed therein.

3. A valve as set forth in claim 1, wherein the serrations comprise at least two different size notches extending from the downstream end of the skirt to adjacent the seating surface.

4. A valve as set forth in claim 1, wherein the skirt has an outer surface of circular cross section seating area on the plug and the serrations increase in depth as the distance from the seating surface on the plug increases.

5. A valve as set forth in claim 4, wherein some of serrations increase in depth at a greater rate than others.

6. A valve as set forth in claim 1, wherein the web is generally cup-shaped, recessed and so disposed so that a convex portion thereof faces the downstream end of the plug, whereby the web is removed from the immediate area of high velocity and turbulence to assist in minimizing the vibration producing forces, which are exerted on the plug as it separates from the seat.

7. A valve as set forth in claim 1, wherein the serrations comprise at least three different size notches extending from the downstream end of the skirt to adjacent the seating surface to provide a multiplicity of differently shaped flow passages into said cavity.

* * * * *